United States Patent [19]
Nobuoka

[11] Patent Number: 5,450,214
[45] Date of Patent: Sep. 12, 1995

[54] VIDEO SIGNAL PROCESSING DEVICE

[75] Inventor: Kousuke Nobuoka, Yokohama, Japan

[73] Assignee: Canon Kabushiki Kaisha, Tokyo, Japan

[21] Appl. No.: 988,829

[22] Filed: Dec. 10, 1992

[30] Foreign Application Priority Data

Dec. 19, 1991 [JP] Japan .................. 3-336990

[51] Int. Cl.6 ............................................. H04N 1/04
[52] U.S. Cl. ................................. 358/479; 358/465; 358/445; 348/392; 348/424; 348/427
[58] Field of Search ............... 358/479, 426, 133, 445, 358/446, 465; 348/392, 399, 398, 396, 424, 427

[56] References Cited

U.S. PATENT DOCUMENTS

| | | | |
|---|---|---|---|
| 4,587,633 | 5/1986 | Wang et al. | 358/479 |
| 4,873,573 | 10/1989 | Thomas et al. | 358/133 |
| 4,890,162 | 12/1989 | McNeely et al. | 348/424 |
| 4,963,992 | 10/1990 | Doi et al. | 348/424 |
| 5,043,810 | 8/1991 | Vreeswijk et al. | 358/133 |
| 5,132,781 | 6/1992 | Shimokoriyama | 348/427 |

*Primary Examiner*—Edward L. Coles, Sr.
*Assistant Examiner*—Madeleine Nguyen
*Attorney, Agent, or Firm*—Fitzpatrick, Cella, Harper & Scinto

[57] ABSTRACT

A video signal processing device is designed to input selectively a first video signal or a sub-sampled second video signal. These inputs are input to a common filter. The output of the filter is output after being sub-sampled, when the first video signal is being input, and without being sub-sampled, when the second video signal is being input. The output level of the filter is changed over between when the first video signal is being output and when the second video signal is being output.

17 Claims, 6 Drawing Sheets

X : THINNED PIXEL

| -1/16 | 0 | 1/8 | 0 | -1/16 |
|---|---|---|---|---|
| 0 | 1/4 | 1/2 | 1/4 | 0 |
| -1/16 | 0 | 1/8 | 0 | -1/16 |

FIG. 6(b)

| -1/8 | 0 | 1/4 | 0 | -1/8 |
|---|---|---|---|---|
| 0 | 1/2 | 1 | 1/2 | 0 |
| -1/8 | 0 | 1/4 | 0 | -1/8 |

VIDEO SIGNAL PROCESSING DEVICE

BACKGROUND OF THE INVENTION

1. Field of the Invention

The present invention relates to a video signal processing device, and more particularly, to a device for processing a video signal which is to be sub-sampled or which has been sub-sampled.

2. Description of the Related Art

Sub-Nyquist sampling or offset sub-sampling has been attracting attention as a sampling method which achieves compression of a video signal. The principle of such sub-sampling methods will be described below briefly.

Figure 1A:
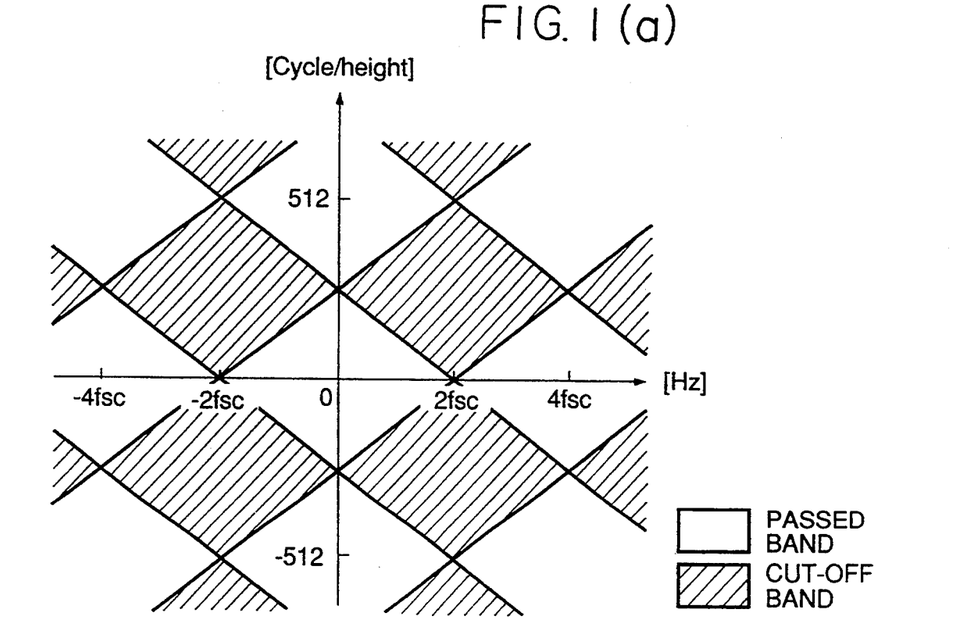
FIG. 1(a) shows the filtering characteristics for a luminance signal in a conventional device.
Figure 1B:
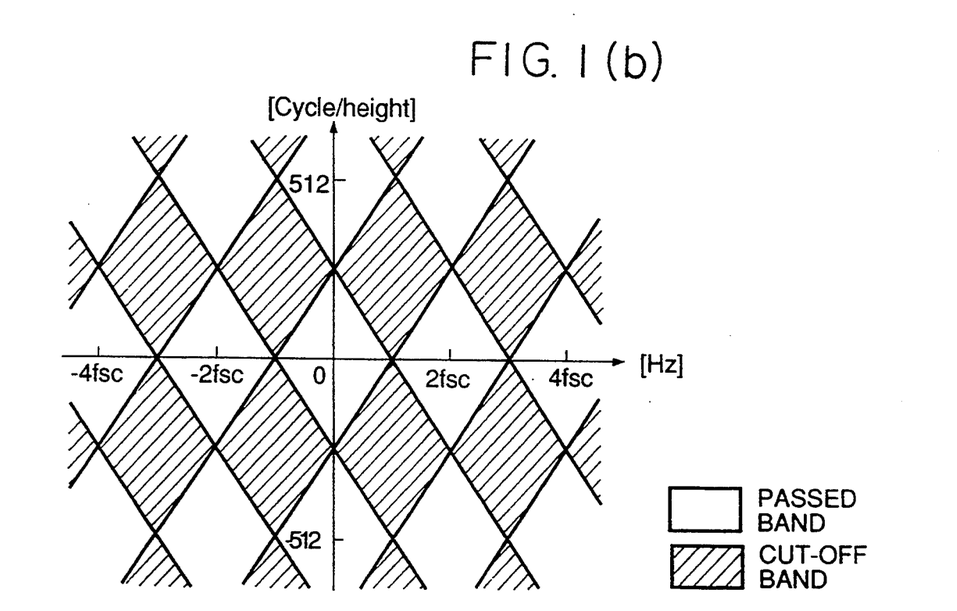
FIG. 1(b) shows the filtering characteristics for a color signal in the conventional device.
Figure 2:
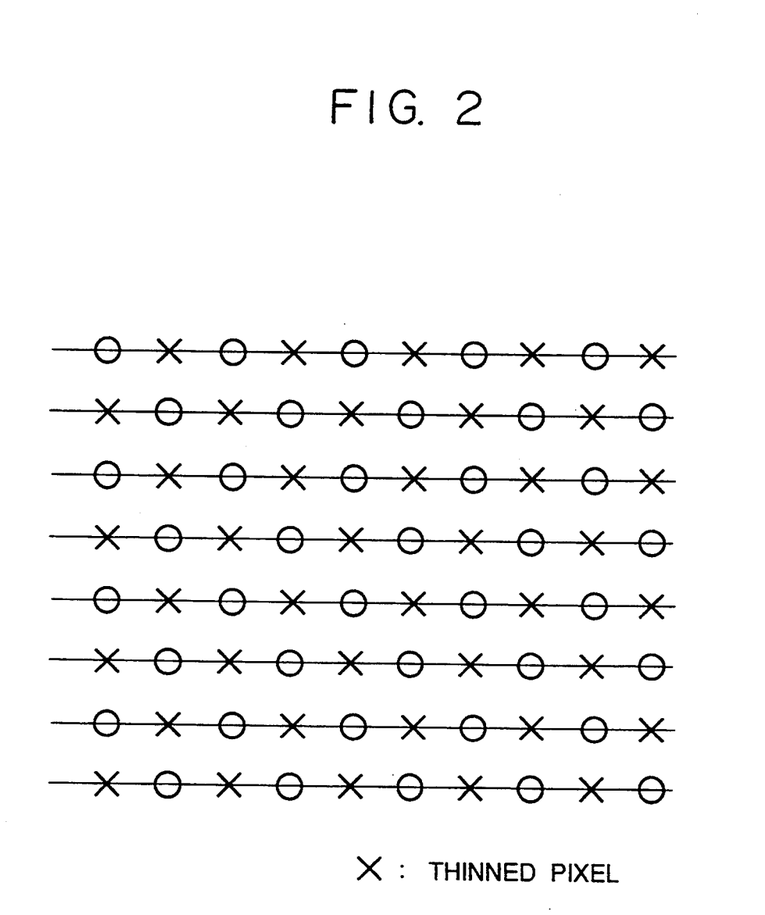
FIG. 2 shows an example of a thinning pattern of pixels in offset sub-sampling.

During modulation, a luminance signal sampled at, for example, 4 fsc (fsc indicates the color sub-carrier frequency) and a color difference signal sampled at 2 fsc are passed through two-dimensional filters (pre-filters) exhibiting the cut-off characteristics shown in FIGS. 1(a) and 1 (b), respectively, to remove the component in an oblique direction which does not visually stand out. Thereafter, pixels represented by each of the signals are thinned out alternately on each line, as shown in FIG. 2, to compress the amount of data to one half without generating aliasing noise.

During demodulation, oversampling is performed by inserting '0' for each of the pixels eliminated by the thinning-out process, and then the signals are passed through two-dimensional filters (post-filters) having similar cut-off characteristics to those shown in FIGS. 1 (a) and 1 (b), to suppress the filter component.

It is thus possible to compress and enlarge image data without greatly deteriorating the image quality.

In such a sub-sampling method, the quality of the demodulated image depends on the cut-off characteristics of the pre-filter and of the post-filter, and the circuit scale depends on the number of taps or coefficients of these filters. In the conventional techniques, the aforementioned pre-filter and post-filter are too large in size and too expensive because of the production cost to be incorporated in household electric appliances.

SUMMARY OF THE INVENTION

An object of the present invention is to provide a video signal processing circuit which can overcome the aforementioned problems of the conventional techniques.

Another object of the present invention is to provide a video signal processing circuit which enables a reduction in the scale of the circuit required to filter both a video signal which has been sub-sampled and a video signal which is yet to be sub-sampled.

To achieve the aforementioned objects, in one aspect of the present invention, there is provided a video signal processing device which comprises (a) first input means for inputting a first video signal, (b) second input means for inputting a second video signal, the second video signal being a sub-sampled signal, (c) selection means for selectively outputting either the first video signal or the second video signal, (d) filter means to which the output of the selection means is input, (e) sub-sampling means for sub-sampling the output signal of the filter means, (f) output means for outputting the output signal of the filter means without passing the signal through the sub-sampling means, (g) supply means for supplying the output of the filter means to the sub-sampling means when the selection means is outputting the first video signal and for supplying the output of the filter means to the output means when the selection means is outputting the second video signal, and (h) adjusting means for adjusting a gain for the output signal of the filter means, the adjustment means changing over the gains between when the selection means is outputting the first video signal and when the selection means is outputting the second video signal.

In another aspect of the present invention, there is provided a video signal processing device, which comprises (a) input means for selectively inputting either a first video signal or a second video signal including sub-sampled samples, (b) filter means to which the output of the input means is input, the filter means including a plurality of delay circuits for sequentially delaying the output of the selection means, and multipliers for multiplying the outputs of the plurality of delay circuits by coefficients, and (c) change-over means for changing over the coefficients between when the input means is inputting the first video signal and when the input means is inputting the second video signal.

Other features and objects of the invention will be apparent from the following description taken in connection with the accompanying drawings.

DETAILED DESCRIPTION OF THE PREFERRED EMBODIMENTS

The preferred embodiments of the present invention will be described below with reference to the accompanying drawings.

Figure 3:
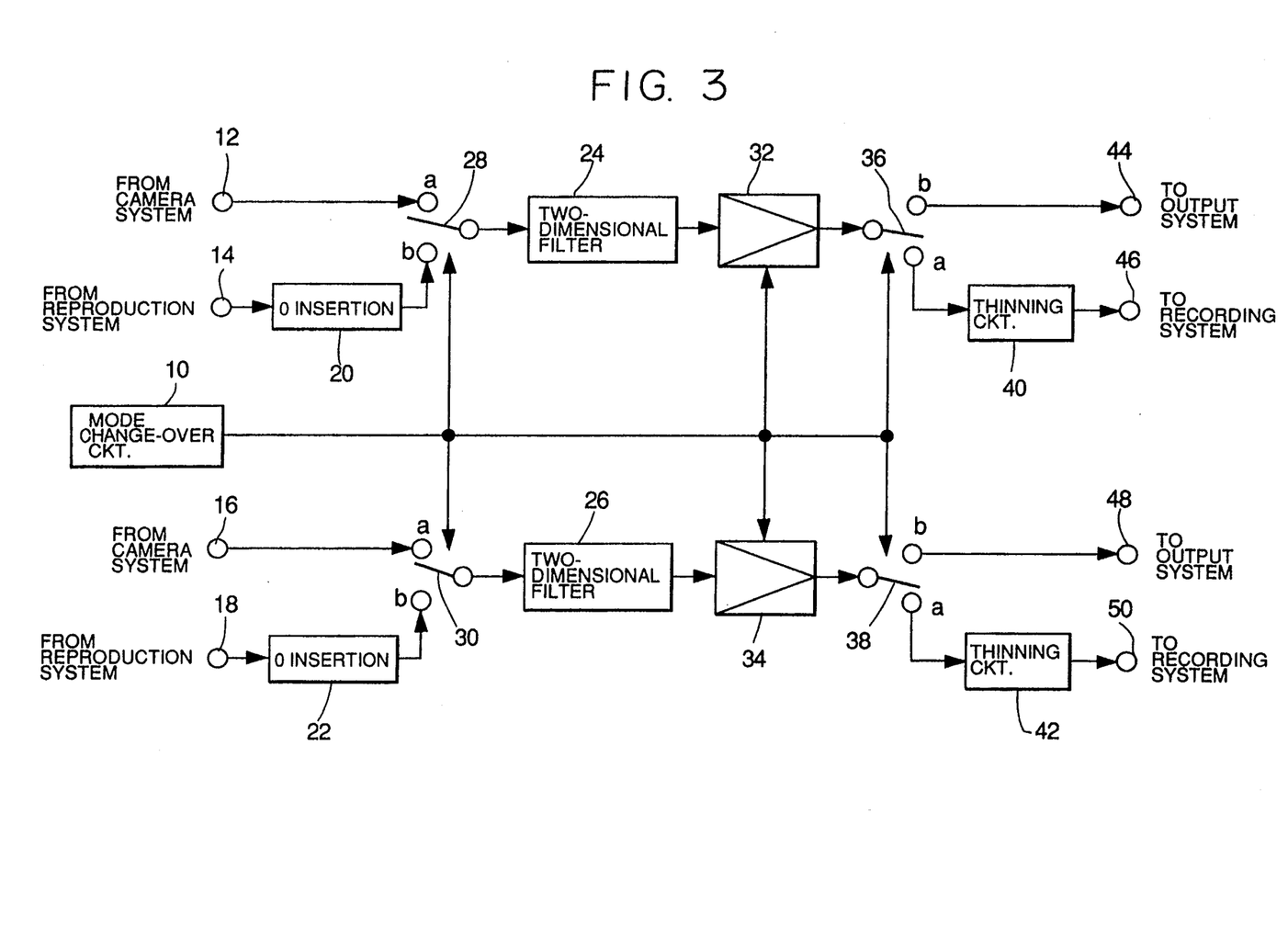
FIG. 3 shows an embodiment of a video signal processing device according to the present invention.

FIG. 3 is a block diagram of an embodiment of a recording/reproducing device with a built-in camera, to which the present invention is applied.

In FIG. 3, reference numeral 10 denotes a mode change-over circuit for generating a recording/reproduction mode signal whose logical level rises for recording and falls for reproduction; 12 denotes an input terminal for a luminance signal from a camera signal processing circuit in a camera system; 14 denotes an input terminal for a reproduced luminance signal from a reproduction system; 16 denotes an input terminal for a line-sequential color difference signal from the camera signal processing circuit of the camera system; 18 denotes an input terminal of a reproduced line-sequential color difference signal from the reproduction system; and 20 and 22 denote 0-inserting circuits for inserting an offset '0' into the reproduced signals input to the input terminals 14 and 18 from the reproduction system, respectively.

Reference numeral 24 denotes a two-dimensional filter for a luminance signal; 26 denotes a two-dimensional filter for a line-sequential color difference signal; 28 denotes a switch for selectively supplying, to the two-dimensional filter 14, either the luminance signal on the input terminal 12 or the output of the 0-insertion circuit; 30 denotes a switch for selectively supplying, to the two-dimensional filter 26, either the line-sequential color difference signal at the input terminal 16 or the output of the 0-insertion circuit; and 28 and 30 denote switches which are changed over by the recording/reproduction mode signal supplied from the mode change-over circuit 10 and thereby connected to the side of the input terminals 12 and 16 (contact 'a') during recording and connected to the side of the 0-insertion circuits 20 and 22 (contact 'b') during reproduction, respectively.

Reference numerals 32 and 34 denote coefficient multipliers for changing DC gains for the output signals from the two-dimensional filters 24 and 26, respectively. Selection of the coefficient to be used as a multiplier is made by means of the recording/reproduction mode signal input from the mode change-over circuit 10. During recording, 1/256 is used for multiplication. During reproduction, 1/128 is as a multiplier.

Reference numerals 36 and 38 denote switches which supplying the outputs of the coefficient multipliers 32 and 34 to either the output system or the recording system, respectively; 40 and 42 denote thinning circuits for performing offset sampling for recording and thereby compressing the input data to one half (i.e., by 50%); 44 denotes an output terminal for a luminance signal and is connected to the output system; 46 denotes an output terminal for a luminance signal and is connected to the recording system; 48 denotes an output terminal for a line-sequential color difference signal and is connected to the output system; 50 denotes an output terminal for a line-sequential color difference signal and is connected to the recording system. The switches 36 and 38 are changed over by the recording/reproduction mode signal supplied from the mode change-over circuit 10 and thereby connected to the input side (contact 'a') of the thinning circuits 40 and 42 during recording and connected to the side (contact 'b') of the output terminals 44 and 48 during reproduction. The outputs of the thinning circuits 40 and 42 are respectively connected to the output terminals 46 and 50.

Figure 4:
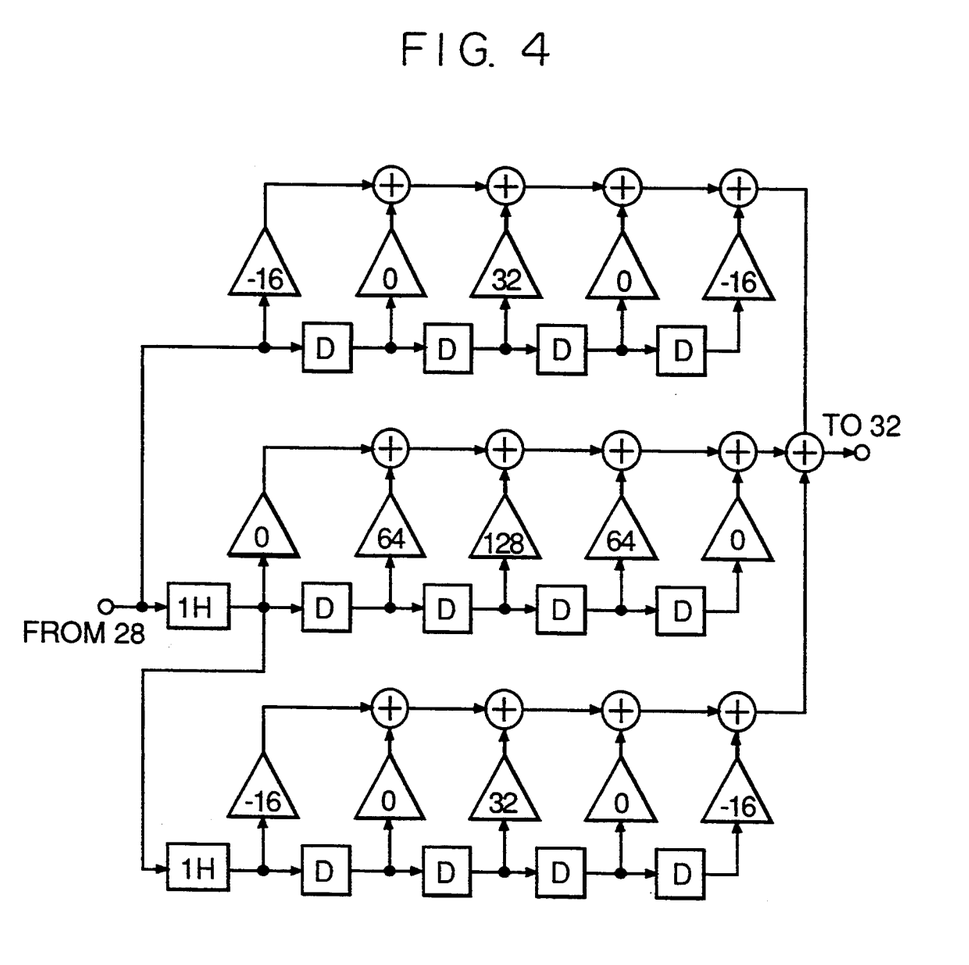
FIG. 4 shows the structure of the two-dimensional filters in FIG. 3.

FIG. 4 shows a circuit configuration of the two-dimensional filter for the luminance signal. The two-dimensional filter 24 includes two 1H (one horizontal scanning duration) delay lines, D flip-flops for delaying the intervals of the pixels, multipliers of predetermined coefficients, and adders. A signal of three consecutive lines is obtained by longitudinal connection of the two 1H (one horizontal scanning during) delay lines. The pixels in the individual lines are weight-averaged in the horizontal directions, and the weighted means of the pixels in the individual lines are added. This filter configuration exhibits cut-off characteristics which assure that the high-frequency component in the horizontal direction is cut off and that the amount of cut-off in the vertical direction is zero. Thus, the number of taps can be reduced and excellent cut-off characteristics can be obtained.

The operation of the circuit shown in FIG. 3 will be described below. During recording, the switches 28, 30, 36 and 38 are connected to contact 'a', and the multiplication coefficient of the coefficient multiplier 32 is set to 1/256. The luminance signal from the camera signal processing circuit (not shown) of the camera system is input to the two-dimensional filter 24 through the input terminal 12 and the switch 28, while the line-sequential color difference signal is input to the two-dimensional filter 26 through the input terminal 16 and the switch 30. The two-dimensional filters 24 and 26 function as pre-filters for sub-Nyquist sampling and suppress the component in an oblique direction.

The coefficient multipliers 32 and 34 respectively multiply the outputs of the two-dimensional filters 24 and 26 by the coefficient 1/256, whereby the DC gain is made 0. The outputs of the coefficient multipliers 32 and 34 are applied to the thinning circuits 40 and 42 through the switches 36 and 38, respectively. The thinning circuits 40 and 42 perform offset sampling on the input signal. The outputs of the thinning circuits 40 and 42 are applied to the recording system from the output terminals 46 and 50, respectively, and are thereby recorded (or sent out to the transmission medium) on the recording medium, such as a magnetic tape.

During reproduction, the switches 28, 30, 36 and 38 are connected to contact 'b' and the multiplication coefficient of the coefficient multiplier 32 is set to 1/128 by means of the recording/reproduction mode signal output from the mode change-over circuit 10. The luminance signal and the line-sequential color difference signal from the reproduction system (or a reception system) which is not shown are respectively applied through the input terminals 14 and 18 to the 0-insertion circuits 20 and 22, respectively, which insert offset '0' into the portion of the signal which has been thinned out by offset sampling. The outputs of the 0-insertion circuits 20 and 22 are applied to the two-dimensional filters 24 and 26 through the switches 28 and 30, respectively. At that time, the two-dimensional filters 24 and 26 function as the post-filters for sub-Nyquist sampling, and thus suppress the carrier component generated by inserting offset '0'.

The coefficient multipliers 32 and 34 multiply the outputs of the two-dimensional filters 24 and 26 by the coefficient 1/128, whereby the DC gain is made 2. The outputs of the coefficient multipliers 32 and 34 are applied to the output system (or a display system), which is not shown, through the switches 36 and 38 and the output terminals 44 and 48, respectively.

Figure 5:
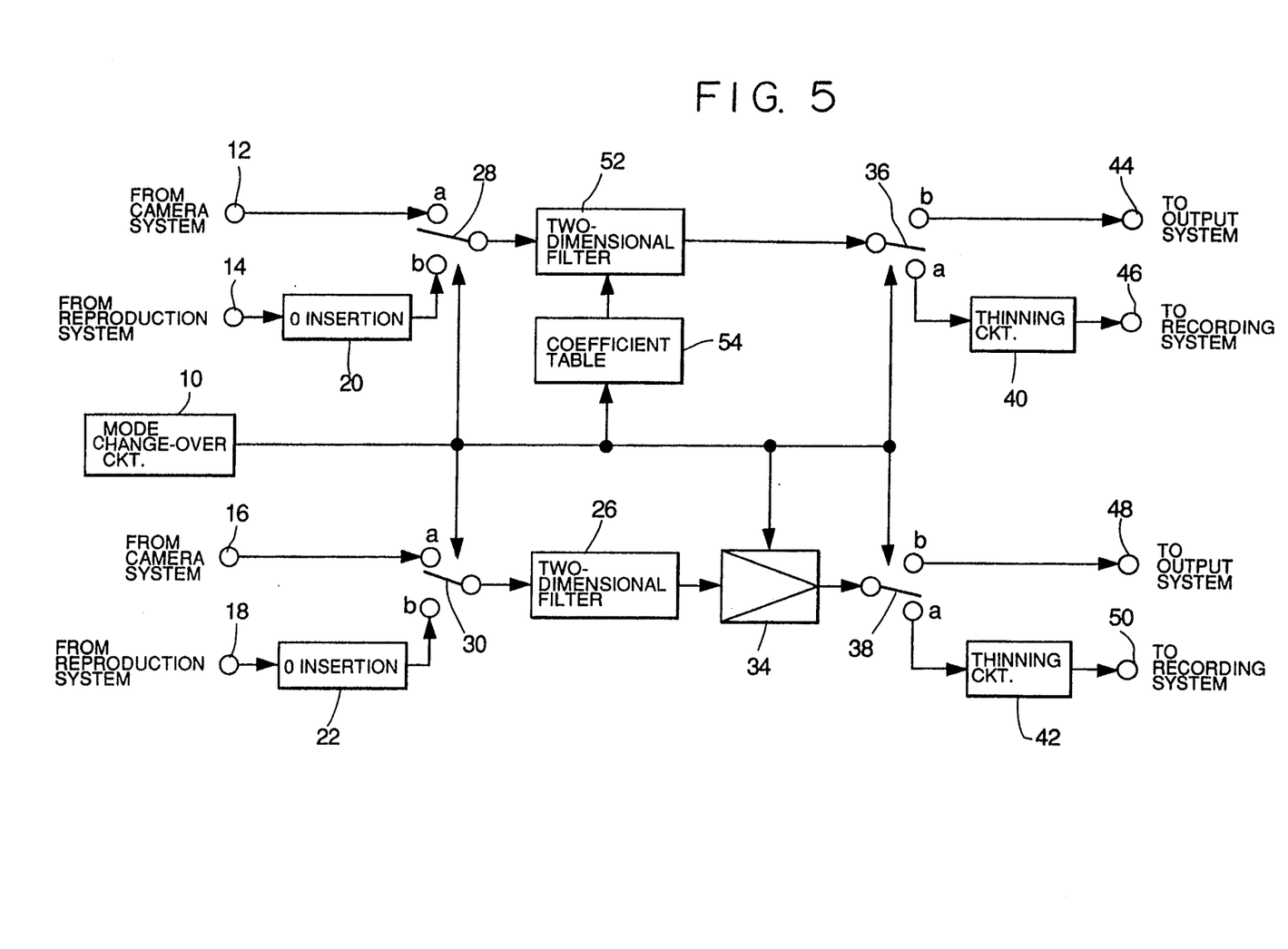
FIG. 5 shows another embodiment of the video signal processing device according to the present invention.
Figure 6A:
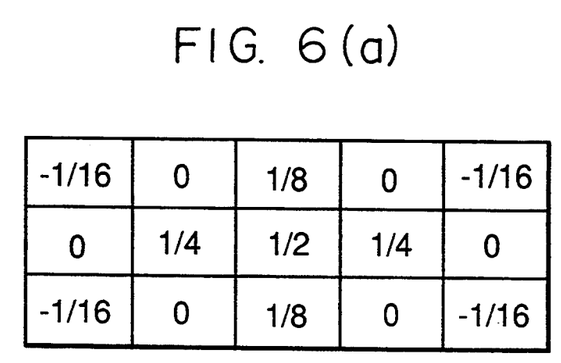
FIGS. 6(a) and 6(b) respectively show the contents of the coefficient table shown in FIG. 5.

The two-dimensional filter 24 may also be arranged such that the coefficients thereof can be changed over between recording and reproduction. This eliminates the provision of the coefficient multiplier 32. FIG. 5 is a block diagram showing a modification of the above embodiment. Identical reference numerals in FIG. 5 to those in FIG. 3 represent similar or identical elements. In this modification, a two-dimensional filter 52 for a luminance signal has the same structure as the two-dimensional filter 24 for a luminance signal as shown in FIG. 3 but is constructed such that the coefficients thereof can be changed over. The coefficients of the two-dimensional filter 52 are stored in a coefficient table 54 and are changed over in accordance with the recording/reproduction mode signal from the mode change-over circuit 10. FIG. 6(a) shows the contents of the coefficient table 54 for recording, and FIG. 6(b) shows the contents of the coefficient table 54 for reproduction.

Figure 6B:
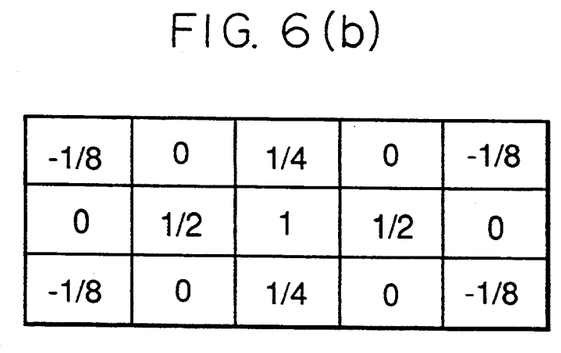

During recording, the coefficients shown in FIG. 6(a) are set in the two-dimensional filter 52 for a luminance signal, while during reproduction, the coefficients shown in FIG. 6(b) are set in the two-dimensional filter 52. In both cases, the high-frequency component in the horizontal direction is suppressed, thus excellently suppressing the component in an oblique direction. For recording, the DC gain of the two-dimensional filter 52 is 1, as can be seen from FIG. 6(a). For reproduction, the DC gain is 2, as is clear from FIG. 6(b). Thus, the adjustment of the DC gain by means of the coefficient multiplier 32 is unnecessary, thus eliminating the provision of the coefficient multiplier 32.

In the aforementioned embodiments, the two-dimensional filters have filtering characteristics such that they attenuate the high-frequency component in the horizontal direction and attenuate no component in the vertical direction, and thus have a reduced number of taps and assure excellent cut-off characteristics.

As will be understood from the foregoing description, in the present invention, since a single two-dimensional filter is used as both the pre-filter and the post-filter, the size of the circuit can be greatly reduced.

While the preferred embodiments have been described, variations thereof will occur to those skilled in the art within the scope of the present invention, which is delineated by the following claims.

What is claimed is:

1. A video signal processing device, comprising:
   (a) first input means for inputting a first video signal;
   (b) second input means for inputting a second video signal, the second video signal having been sub-sampled;
   (c) selection means for selectively outputting either the first video signal or the second video signal;
   (d) filter means to which an output from said selection means is input;
   (e) sub-sampling means for sub-sampling an output signal from said filter means;
   (f) output means for outputting the output signal from said filter means without the output signal from said filter means having passed through said sub-sampling means;
   (g) supply means for supplying the output signal from said filter means to said sub-sampling means when said selection means is outputting the first video signal and for supplying the output signal from said filter means to said output means when said selection means is outputting the second video signal; and
   (h) gain setting means for setting a gain for the output signal from said filter means to a first gain when said selection means is outputting the first video signal and to a second gain different from the first gain when said selection means is outputting the second video signal.

2. A device according to claim 1, wherein the second video signal includes sub-sampled samples and samples having a predetermined value and inserted between the sub-sampled samples.

3. A device according to claim 1, further comprising generation means for generating a control signal for controlling said selection means, said gain setting means and said supply means.

4. A device according to claim 1, wherein said filter means restricts a bandwidth of the output signal from said selection means in both horizontal and vertical directions of an image.

5. A video signal processing device, comprising:
   (a) input means for selectively inputting a first video signal or a second video signal including sub-sampled samples;
   (b) filter means to which an output of said input mean is input; and
   (c) gain setting means for setting a gain for an output signal of said filter means to a first gain when said input means is inputting the first video signal and to a second gain different from the first gain when said input means is inputting the second video signal.

6. A device according to claim 5, further comprising output means for sub-sampling and outputting the output signal of said filter means when said input means is inputting the first video signal and for outputting the output signal of said filter means when said input means is inputting the second video signal without sub-sampling the signal.

7. A device according to claim 6, further comprising generation means for generating a control signal for controlling said input means, said gain setting means and said output means.

8. A device according to claim 5, wherein the second video signal includes sub-sampled samples and samples having a predetermined value and inserted between the sub-sampled samples.

9. A device according to claim 5, wherein said filter means restricts a bandwidth of the output of said input means in both horizontal and vertical directions of an image.

10. A video signal processing device, comprising:
    (a) first input means for inputting a first video signal;
    (b) second input means for inputting a second video signal, the second video signal having been sub-sampled;
    (c) selection means for selectively outputting either the first video signal or the second video signal;
    (d) filter means to which an output of said selection means is input, said filter means including a plurality of delay circuits for sequentially delaying the output of said selection means, and multipliers for multiplying outputs of said plurality of delay circuits by coefficients;
    (e) sub-sampling means for sub-sampling an output signal of said filter means;
    (f) output means for outputting the output signal of said filter means without the output signal of said filter means having passed through said sub-sampling means;
    (g) supply means for supplying the output signal of said filter means to said sub-sampling means when said selection means is outputting the first video signal and for supplying the output signal of said filter means to said output means when said selection means is outputting the second video signal; and
    (h) setting means for setting the coefficients to first coefficients when said selection means is outputting the first video signal and to second coefficients different from the first coefficients when said selection means is outputting the second video signal.

11. A device according to claim 10, wherein the second video signal includes sub-sampled samples and samples having a predetermined value and inserted between the sub-sampled samples.

12. A device according to claim 10, further comprising generation means for generating a control signal for controlling said selection means, said setting means and said supply means.

13. A device according to claim 10, wherein said filter means restricts a bandwidth of the output signal of said selection means in both horizontal and vertical directions of an image.

14. A video signal processing device comprising:
(a) input means for selectively inputting either a first video signal or a second video signal including sub-sampled samples;
(b) filter means to which an output of said input means is input, said filter means including a plurality of delay circuits for sequentially delaying the output of said input means, and multipliers for multiplying outputs of said plurality of delay circuits by coefficients; and
(c) setting means for setting the coefficients to first coefficients when said input means is inputting the first video signal and to second coefficients different from the first coefficients when said input means is inputting the second video signal.

15. A device according to claim 14, further comprising output means for sub-sampling and outputting the output of said filter means when said input means is inputting the first video signal and for outputting the output of said filter means when said input means is inputting the second video signal without sub-sampling the signal.

16. A device according to claim 15, further comprising generation means for generating a control signal for controlling said input means, said setting means and said output means.

17. A device according to claim 14, wherein the second video signal includes sub-sampled samples and samples having a predetermined value and inserted between the sub-sampled samples.

* * * * *